US012670891B2

(12) United States Patent
Zhang et al.

(10) Patent No.: US 12,670,891 B2
(45) Date of Patent: Jun. 30, 2026

(54) ACOUSTIC REINFORCING MATERIAL BLOCK AND APPLICATION THEREOF, MICRO LOUDSPEAKER AND ELECTRONIC DEVICE

(71) Applicant: SSI NEW MATERIAL (ZHENJIANG) CO., LTD., Zhenjiang (CN)

(72) Inventors: Lei Zhang, Zhenjiang (CN); Mingbo Guo, Zhenjiang (CN); Chang Gong, Zhenjiang (CN); Junjie Zhao, Zhenjiang (CN); Yuanhong Ma, Zhenjiang (CN); Renkun Liu, Zhenjiang (CN)

(73) Assignee: SSI NEW MATERIAL (ZHENJIANG) CO., LTD., Zhenjiang (CN)

( * ) Notice: Subject to any disclaimer, the term of this patent is extended or adjusted under 35 U.S.C. 154(b) by 305 days.

(21) Appl. No.: 18/361,095

(22) Filed: Jul. 28, 2023

(65) Prior Publication Data

US 2023/0368765 A1      Nov. 16, 2023

Related U.S. Application Data

(63) Continuation of application No. PCT/CN2022/074666, filed on Jan. 28, 2022.

(30) Foreign Application Priority Data

Jan. 28, 2021   (CN) ......................... 202110116598.0
Jan. 28, 2021   (CN) ......................... 202120238557.4

(51) Int. Cl.
G10K 11/168         (2006.01)
B32B 3/30           (2006.01)
(Continued)

(52) U.S. Cl.
CPC .............. *G10K 11/168* (2013.01); *B32B 3/30* (2013.01); *B32B 5/26* (2013.01); *B32B 7/12* (2013.01);
(Continued)

(58) Field of Classification Search
None
See application file for complete search history.

(56) References Cited

U.S. PATENT DOCUMENTS 5,309,690 A * 5/1994 Symons ................. B32B 29/08
                                          428/116
8,771,639 B2 * 7/2014 Yoon ....................... C01B 39/02
                                          502/64
(Continued)

FOREIGN PATENT DOCUMENTS

CN      108275696 A      7/2018
CN      109647328 A      4/2019
(Continued)

OTHER PUBLICATIONS

Lee, S., Acoustic Article, Jun. 9, 2020, machine translation of CN 111263961A (Year: 2020).*
(Continued)

*Primary Examiner* — Chinessa T. Golden
(74) *Attorney, Agent, or Firm* — Hoffman Warnick LLC

(57)         ABSTRACT

Provided in the present application are an acoustic reinforcing material block and an application thereof, a micro loudspeaker and an electronic device. The raw materials of the acoustic reinforcing material block include a porous material, an adhesive, and an adjuvant loaded in a structural framework. The micro loudspeaker comprises an upper housing and a lower housing which form an inner cavity, and a loudspeaker unit located in the inner cavity, wherein the inner cavity is divided into a front cavity and a rear cavity,
(Continued)

layered framework material corrugated framework material and the front cavity is in communication with a sound outlet hole; and a front cavity resonant cavity which is in communication with the front cavity and filled with an acoustic enhancing material is provided in the upper housing.

11 Claims, 5 Drawing Sheets

(51) Int. Cl.
  *B32B 5/26* (2006.01)
  *B32B 7/12* (2006.01)
(52) U.S. Cl.
  CPC ..... *B32B 2307/10* (2013.01); *B32B 2307/718* (2013.01)

(56) References Cited

U.S. PATENT DOCUMENTS

| | | | |
|---|---|---|---|
| 12,033,607 B2 | 7/2024 | Lee et al. | |
| 2010/0320030 A1* | 12/2010 | Ogawa ................... | B32B 5/022 |
| | | | 181/294 |
| 2011/0274308 A1* | 11/2011 | Doh ........................ | H04R 9/06 |
| | | | 381/398 |
| 2013/0170687 A1 | 7/2013 | Papakyriacou et al. | |
| 2018/0022056 A1* | 1/2018 | Shen ........................ | F16F 1/37 |
| | | | 428/117 |
| 2019/0035375 A1 | 1/2019 | Cao | |
| 2019/0058935 A1 | 2/2019 | Lembacher et al. | |
| 2019/0158951 A1 | 5/2019 | Cao | |
| 2020/0037062 A1 | 1/2020 | Dai | |
| 2020/0045393 A1 | 2/2020 | Wu et al. | |
| 2020/0045397 A1 | 2/2020 | Wu et al. | |
| 2020/0045415 A1 | 2/2020 | Wu et al. | |
| 2021/0375251 A1 | 12/2021 | Lee et al. | |

FOREIGN PATENT DOCUMENTS

| | | | | |
|---|---|---|---|---|
| CN | 110381399 A | 10/2019 | | |
| CN | 111179897 A | 5/2020 | | |
| CN | 111263961 A | * | 6/2020 | .......... G10K 11/168 |
| CN | 111417063 A | | 7/2020 | |
| CN | 111711885 A | * | 9/2020 | .......... G10K 11/162 |
| CN | 215040822 U | | 12/2021 | |
| JP | S4942114 | | 4/1974 | |
| WO | 2020125703 | | 6/2020 | |

OTHER PUBLICATIONS

Chen, D., Loudspeaker, Sep. 25, 2020, machine translation of CN 111711885A (Year: 2020).*
The Second Office Action issued on Jun. 28, 2024 for counterpart Chinese patent application No. 202110116598.0.
First Office Action issued on Jul. 19, 2024 for counterpart Korean patent application No. 10-2023-7028857.
The extended European search report issued on Sep. 18, 2024 for counterpart European patent application No. 22745339.6.
Third Office Action and Search Report issued Oct. 8, 2024 in Chinese Patent Application No. 202110116598.0.
First Office Action issued Nov. 12, 2024 in Japanese Patent Application No. 2023-546166.
Decision of Dismissal of Amendment by the Japan Patent Office issued for corresponding Japanese Patent Application No. 2023-546166 mailed on Apr. 1, 2025.
First Office Action issued on Mar. 27, 2025 for counterpart Vietnam patent application No. 1-2023-05701, along with the English translation.
First Office Action and Search Report issued on Jan. 25, 2024 for counterpart Chinese patent application No. 202110116598.0.
PCT International Search Report and Written Opinion for International Application No. PCT/CN2022/074666, dated May 13, 2022, 2 pages.
Decision of Rejection issued on Jan. 9, 2025 for counterpart Chinese patent application No. 202110116598.0, along with EN translation.
The Supplementary search report issued on Jan. 3, 2025 for counterpart Chinese patent application No. 202110116598.0, along with machine EN translation.
Yang, "Broadcast Technology" (2014).
Extended European Search Report issued on Dec. 1, 2025 for counterpart European patent application No. 25198769.9.

* cited by examiner layered framework material corrugated framework material screen cloth acoustic reinforcing thin sheet gap holes acoustic reinforcing block cavity shell

A-A

A-A

B-B

ACOUSTIC REINFORCING MATERIAL BLOCK AND APPLICATION THEREOF, MICRO LOUDSPEAKER AND ELECTRONIC DEVICE

CROSS-REFERENCE TO RELATED APPLICATIONS

This application is a continuation of International Application No. PCT/CN2022/074666, filed on Jan. 28, 2022, which claims priority to Chinese Patent Application No. 202110116598.0 and Chinese Patent Application No. 202120238557.4, filed on Jan. 28, 2021, both of which are hereby incorporated by reference in their entireties.

FIELD OF TECHNOLOGY

The present disclosure relates to the technical field of speakers, and in particular to an acoustic reinforcing block and use thereof, a micro speaker and an electronic device.

BACKGROUND ART

With the continuous development of cell phone terminal devices, users have become more demanding of audio quality of cell phones. In addition to the overall loudness, the demands of users for sound quality are also gradually increasing. The high frequency performance, band width and unevenness of a micro speaker have a significant impact on users' experience in the enjoyment and details of music.

Due to the existence of the resonance of the front cavity and unit dome resonance, the FR curve of a speaker's high frequency response is often not flat with a band width. In order to solve this problem, an approach by introducing a front cavity resonator is often used. However, this approach tends to result in a high peak value (Q value), such that the FR curve of high frequency could not reach an ideal state.

At present, there are only a few technical means to improve the uneven high-frequency performance and poor performance of the micro speaker. For example:

1. Improvements are made only with respect to the structural dimensions of the front acoustic cavity and sound holes, which tends to be limited by the ready-made ID designs of products.

2. Correction of high frequency is done by using an appropriate audio algorithm, but this tends to cause sound "distortion", thereby losing the sense of naturalness.

3. A front cavity resonator or a filter structure inside a front cavity resonator is added, but this increases the mold cost and is also limited by the ready-made ID designs of products.

SUMMARY

In order to solve the above problems, an object of the present disclosure is to provide an acoustic reinforcing block and use thereof, a micro speaker and an electronic device. The micro speaker can effectively improve the flatness of the high frequency performance curve of the speaker by filling the front cavity resonantor with an acoustic reinforcing material. Such a micro speaker is simple to make and can reduce the mold difficulty.

In order to achieve the above object, the present disclosure provides an acoustic reinforcing block, wherein the raw materials for the acoustic reinforcing block comprises a porous material, a framework material, an adhesive and an adjuvant, wherein the structural framework of the acoustic reinforcing block is formed of a single layer of the framework material or by alternating lamination of two or more layers of the framework material, and the porous material, the adhesive and the adjuvant are supported on the structural framework.

In the above acoustic reinforcing block, the alternating lamination means that two or more individual layers of the framework material are arranged in layers along the same direction.

In a specific embodiment of the present disclosure, the acoustic reinforcing block refers to a material that can improve the acoustic performance of devices such as speakers, which can generally increase the acoustic virtual volume of devices such as speakers and reduce the lowest resonant frequency of speaker devices.

In a specific embodiment of the present disclosure, the porous material, adhesive and adjuvant may be located on the surface of the framework material and/or permeated into the internal voids of the monolayer framework material.

According to a specific embodiment of the present disclosure, the acoustic reinforcing block generally comprises 5-15% of the framework material, 2-10% of the adhesive, 0.05-2% of the adjuvant, and a balance of the porous material, based on 100% by mass of the acoustic reinforcing block, wherein the mass of the adhesive is measured as the solid mass of the adhesive in the acoustic reinforcing block.

According to a specific embodiment of the present disclosure, the acoustic reinforcing block may be a single block and/or a block formed by lamination of two or more acoustic reinforcing blocks (typically layered thin blocks). In some embodiments, the acoustic reinforcing block may be produced by roasting, drying or lyophilization.

According to a specific embodiment of the present disclosure, the porous material may comprise one or a combination of two or more of zeolite, activated carbon, and MOF materials.

According to a specific embodiment of the present disclosure, the zeolite has a Si (silicon)/M mass ratio of generally 200 or more, wherein the M is generally a trivalent metallic element, i.e., a metallic element having a positive trivalent state, for example one or a combination of two or more of iron, aluminum and titanium.

According to a specific embodiment of the present disclosure, the zeolite may comprise one or a combination of two or more of MFI structured molecular sieves, FER structured molecular sieves, CHA structured molecular sieves, IHW structured molecular sieves, IWV structured molecular sieves, ITE structured molecular sieves, UTL structured molecular sieves, VET structured molecular sieves, MEL structured molecular sieves, and MTW structured molecular sieves.

According to a specific embodiment of the present disclosure, the adhesive may comprise an organic adhesive and/or an inorganic adhesive.

According to a specific embodiment of the present disclosure, the organic adhesive may comprise one or a combination of two or more of a polyacrylate suspension, a polystyrene acetate suspension, a polyvinyl acetate suspension, a polyethylene-vinyl acetate suspension, and a polybutadiene rubber suspension.

According to a specific embodiment of the present disclosure, the inorganic adhesive may comprise one or a combination of two or more of a silica sol, an alumina sol, and pseudo-boehmite (e.g., SB powder).

According to a specific embodiment of the present disclosure, the adjuvant may comprise one or a combination of two or more of CMC (carboxymethylcellulose), montmorillonite, kaolin, attapulgite and mica powder.

According to a specific embodiment of the present disclosure, the mechanical properties of the acoustic reinforcing block can be effectively improved by adding a framework material to form a structural framework. The framework material is generally a fiber material, usually including one or a combination of two or more of fibrous paper, fibrous cloth and fibrous felt.

According to a specific embodiment of the present disclosure, the framework material is generally formed by alternating lamination of layered and/or corrugated fibrous paper, fibrous cloth and fibrous felt. FIG. 1 illustrates an alternating lamination of layered and/or corrugated fibrous materials. In some specific embodiments, the corrugated fibrous paper, fibrous cloth and fibrous felt generally have a corrugation height of 0.2 mm to 2 mm.

According to a specific embodiment of the present disclosure, the framework material may comprise chemical fibers. Specifically, the framework material may be prepared from chemical fibers by one of blended spinning, bonding or wet forming.

According to a specific embodiment of the present disclosure, the framework material generally has a grammage per unit area of 10 g/m² to 100 g/m².

According to specific embodiments of the present disclosure, an individual fiber in the chemical fibers generally has a diameter of 2 µm to 40 µm.

According to a specific embodiment of the present disclosure, composite fibers are generally used as the chemical fibers. In some specific embodiments, the chemical fibers may comprise inorganic fibers and/or synthetic fibers. The inorganic fibers may include glass and/or ceramic fibers, and the synthetic fibers may include one or a combination of two or more of terylene, nylon, acrylic, polypropylene, vinylon, and chlorofibre. In some specific embodiments, the chemical fibers may be surface treated to increase their properties, for example by using a silane coupling agent to modify the surface of the chemical fibers.

The present disclosure further provides the use of the acoustic reinforcing block in a micro speaker. When the acoustic reinforcing block is filled in the cavity of the micro speaker, it can virtually expand the acoustic volume of the cavity of the micro speaker and reduce the resonant frequency of the speaker. At the same time, since the acoustic reinforcing block has a layered structure and high mechanical properties, and is generally a block, it has superior performance and reliability in use, does not need additional apertures, and the risk of failure by powder falling is reduced.

The present disclosure further provides a micro speaker comprising an upper shell, a lower shell and a speaker unit, wherein the upper shell and the lower shell form an inner cavity, the speaker unit is located in the inner cavity, and the upper shell is provided with a sound hole on one side; the inner cavity is divided into a front cavity and a rear cavity, wherein the front cavity is a cavity between the top of the speaker and the upper shell and communicates with the sound hole; and a front cavity resonator is further provided inside the micro speaker, wherein the front cavity resonator is provided with a vent hole communicating with the front cavity, and the front cavity resonator is filled with an acoustic reinforcing material.

In a specific embodiment of the present disclosure, the upper shell and the lower shell are generally hermetically combined (e.g., with an adhesive) to form an inner cavity, wherein the upper shell is the top casing and side casing of the micro speaker, the lower shell is the bottom casing of the micro speaker, and the inner cavity formed by combining the upper shell and the lower shell can accommodate a speaker unit. The speaker unit can be fixed to the side wall of the upper shell, and there is generally a space between the top of the speaker unit and the upper shell (in some specific embodiments, this space is contained in the front cavity). A cushioning material such as a foam is generally filled between the bottom of the speaker unit and the lower shell. The height of the top of the speaker unit inside the micro speaker matches the height of the opening of the sound hole. Thus, the boundary of the front cavity is the vertical surface where the side of the speaker unit is located relative to the sound hole and the horizontal surface where the top of the speaker unit is located. At this point, the front cavity can be regarded as the cavity between the speaker unit and the upper shell, and the rear cavity is the cavity of the remaining part of the inner cavity.

According to a specific embodiment of the present disclosure, the vent hole is used to connect the front cavity resonator to the front cavity. In the present disclosure, the size and location of the vent hole is not specifically limited, and a person skilled in the art may determine the appropriate size and location of the vent hole as practically necessary, so long as the purpose of the present disclosure can be achieved. The vent hole may be provided in a port of the front cavity resonator, specifically in the center or on the side of the front cavity resonator. The vent hole of the front cavity resonator may be in a square, rectangular, round, diamond or oval shape.

According to a specific embodiment of the present disclosure, the position of the front cavity resonator is generally not lower than the position of the speaker unit in the vertical direction, that is, it is generally located above the speaker or provided parallel to the speaker unit.

According to a specific embodiment of the present disclosure, the front cavity resonator may be provided in the upper shell above the front cavity, for example, in the upper shell above the center or periphery of the front cavity. The front cavity resonator may be provided surrounding the speaker unit. In this case, the internal top surface of the upper shell can be provided with a spacing protrusion. The spacing protrusion is used to separate the front cavity and the rear cavity, such that they are not communicated. Specifically, the spacing protrusion is generally in a vertical downward direction and set along the edge of the side of the speaker, and its height corresponds to the distance from the top of the speaker unit to the top of the micro speaker. The spacing protrusion together with the top of the speaker unit and the upper shell form the front cavity.

According to a specific embodiment of the present disclosure, the front cavity resonator may also be provided in the upper shell above the rear cavity and communicate with the front cavity through the vent hole. In this case, the upper shell also includes a first retaining wall and a second retaining wall arranged inside the micro speaker, and the first retaining wall and the second retaining wall are generally fixed by way of connection with the inner wall of the side casing. At this time, the upper shell can be regarded as including a first casing and a second casing, the first casing being the top shell of the micro speaker, and the second casing (or referred as the middle casing) consisting of the side casing, the first retaining wall, and the second retaining wall of the micro speaker. The first retaining wall is used to separate the front cavity from the rear cavity. In this case, the boundary of the front cavity comprises the vertical surface wherein the first retaining wall is located, the top surface of the speaker and the first casing; that is, the front cavity is surrounded and formed by the first retaining wall, the top of the speaker unit, the first casing and the side casing of the micro speaker, and the rear cavity is the cavity other than the front cavity in the inner cavity. The second retaining wall is used to separate the front cavity resonator from the rear cavity to ensure that that the front cavity resonator is not communicated with the rear cavity. In some specific embodiments, the first casing and the second casing can be sealed and fixed by bonding, ultrasonic welding, etc.

According to a specific embodiment of the present disclosure, the inner side wall of the upper shell may further comprise a protruding platform (generally an annular protruding platform) to secure the speaker. When the upper shell includes a first casing and a second casing, the protruding platform can be regarded as a part of the second casing, and it may abut between the first retaining wall and the side casing where the sound hole is located and/or the side casing adjacent to the sound hole. In the vertical direction, the protruding platform is generally provided in the middle of the micro speaker.

According to a specific embodiment of the present disclosure, the speaker unit may comprise a vibrating diaphragm, a voice coil assembly fixedly connected to the vibrating diaphragm and a magnetic circuit system, and the edge of the vibrating diaphragm is fixed to the magnetic circuit system. When the front cavity resonator is located above the front cavity, the horizontal surface where the vibrating diaphragm of the speaker unit is located and the upper shell forms the front cavity; when the front cavity resonator is located above the rear cavity, that is, the micro speaker comprises the first retaining wall and the second retaining wall, the horizontal surface where the vibrating diaphragm of the speaker unit is located and the space between the first casing and the second casing forms the front cavity.

According to a specific embodiment of the present disclosure, the volume of the acoustic reinforcing material is generally controlled at 10-90%, preferably 40-60% of the total volume of the front cavity resonator. In some specific embodiments, the acoustic reinforcing material in the front cavity resonator may be located close to the vent hole or far from the vent hole.

According to a specific embodiment of the present disclosure, the acoustic reinforcing material may comprise the above acoustic reinforcing block (generally a block) and/or acoustic reinforcing particles. The acoustic reinforcing particles may be, for example, the zeolite material disclosed in CN Application No. 201510388038.5 (Publication No. CN105049997A, entitled with "Loudspeaker System with Improved Sound"), the entire contents of which are hereby incorporated by reference.

According to a specific embodiment of the present disclosure, when the front cavity resonator is filled with the acoustic reinforcing block, the interior of the front cavity resonator may also be provided with a cushioning material that lines the inner wall of the cavity.

According to a specific embodiment of the present disclosure, when the front cavity resonator is filled with acoustic reinforcing particles, the vent hole may also be provided with a screen cloth for separating the acoustic reinforcing particles from the front cavity, while avoiding the acoustic reinforcing particles falling off the front cavity resonator. According to a specific embodiment of the present disclosure, the acoustic reinforcing block may also be filled at locations in the rear cavity other than the front cavity resonator, so as to virtually expand the volume of the rear cavity to further enhance the low frequency performance of the speaker.

The present disclosure further provides an electronic device which comprises the micro speaker as described above.

Advantageous effects of the present disclosure are as follows:

1. The acoustic reinforcing block provided by the present disclosure, in which a framework material is used as a carrier, avoids the fluctuation of the performance of the acoustic reinforcing block due to the difficulty of dispersing the additives during the preparation process by directly loading an additive such as a porous material on the carrier. Moreover, the application of the framework material can significantly enhance the mechanical strength of the acoustic reinforcing block. The addition of an adjuvant can significantly improve the anti-dropping reliability of the acoustic reinforcing block and stabilize the performance of the acoustic reinforcing block.

2. When sheet-like acoustic reinforcing blocks are stacked and used as a whole, the pores between the layered acoustic reinforcing blocks and the pores among the framework materials laminated in the acoustic reinforcing blocks provide sufficient airflow channels, which allows sufficient action between gas and the acoustic reinforcing blocks. This approach not only ensures excellent mechanical properties of the acoustic reinforcing block and contributes to improving the acoustic properties of the loudspeaker, but also avoids the configuration of additional apertures in the acoustic reinforcing blocks and reduces the risk of breaking and powder falling in the acoustic reinforcing blocks.

3. In the micro speaker provided by the present disclosure, by filling a certain percentage of acoustic reinforcing blocks in the front cavity resonator, it can effectively improve the flatness of the high frequency performance curve of the speaker having the front cavity resonator. Moreover, this way of improving the flatness of the high-frequency performance curve is more effective than the way of providing a filter structure. At the same time, the micro speaker provided by the present disclosure is simple to make and can reduce the mold difficulty.

REFERENCE NUMBERS OF MAIN COMPONENTS

1—upper shell, 2—lower shell, 4—speaker unit, 5—rear cavity, 6—front cavity, 7—sound hole, 8—front cavity resonator, 81—vent hole, 82—acoustic reinforcing material, 11—first casing, 31—second casing, 41—vibrating diaphragm, 61—spacing protrusion, 91—first retaining wall, 92—second retaining wall, 93—protruding platform.

DETAILED DESCRIPTION OF PREFERRED EMBODIMENTS

In order to have a clearer understanding of the technical features, objectives and beneficial effects of the present disclosure, the following detailed description of the technical solutions of the present disclosure is provided, but it is not to be construed as limiting the scope of the practicable scope of the present disclosure.

In the description of the present disclosure, it is to be understood that the orientation or positional relationship indicated by the terms "center", "upper", "lower", "front", "rear", "vertical", "horizontal", "top", "bottom", "inside", "outside" or the like, is based on the orientation or positional relationship shown in the accompanying drawings and is intended only to facilitate and simplify the description of the disclosure, but not to indicate or imply that the equipment or component referred to must be of a particular orientation or constructed and operated in a particular orientation, and therefore cannot be construed as limiting the present disclosure.

In addition, the terms "first" and "second" are used for descriptive purposes only and are not to be construed as indicating or implying relative priority or implicitly specifying the number of the indicated technical features. Thus, a feature limited by "first" and "second" may explicitly or implicitly include one or more of such features. In the description of the present disclosure, "a plurality of" means two or more, unless otherwise expressly and specifically limited.

Example 1

This example provides an acoustic reinforcing block. This material comprises 6.4% of a polyacrylate suspension, 0.1% of CMC, 12.6% of a framework material, and a balance of a porous material, based on 100% by mass in total of the acoustic reinforcing block. The porous material used is a MFI structured molecular sieve with a Si/M mass ratio of 350, where M is aluminum; the framework material used is formed by alternating lamination of layered fibrous paper which is obtained from short-cut alkali-free glass fibers by a wet process and is surface treated with a silane coupling agent KH550. The fibrous paper has a grammage per unit area of 25 g/m$^2$ and a fiber diameter of 7 μm.

Figure 1:
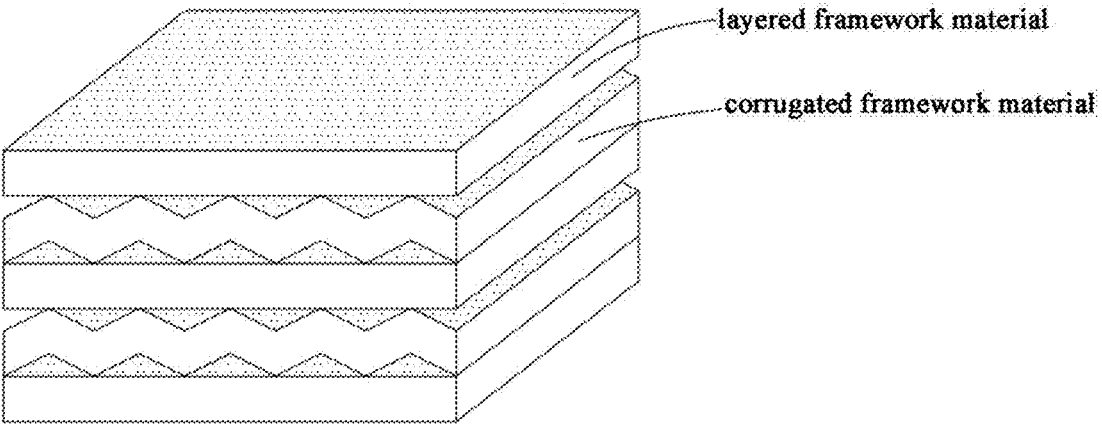
FIG. 1 is a schematic diagram of the alternating lamination of a framework material in some embodiments of the present disclosure.

During the process of preparing the above acoustic reinforcing block, the fibrous paper is first cut to fit the size and shape of the speaker cavity to be filled. Then, the polyacrylate suspension, CMC and MFI molecular sieve are mixed to form a homogeneous slurry. The slurry is used to completely impregnate the cut fibrous paper to obtain a thin block of monolayer acoustic reinforcing material. In some embodiments, it is also possible to obtain an acoustic reinforcing block with a multilayer structural framework by alternating lamination of a plurality of fibrous paper. The internal structure of the block can be as shown in FIG. 1. Additives such as the MFI molecular sieve are located between the layers of the structural framework and penetrate into the interior of the structural framework.

Figure 2:
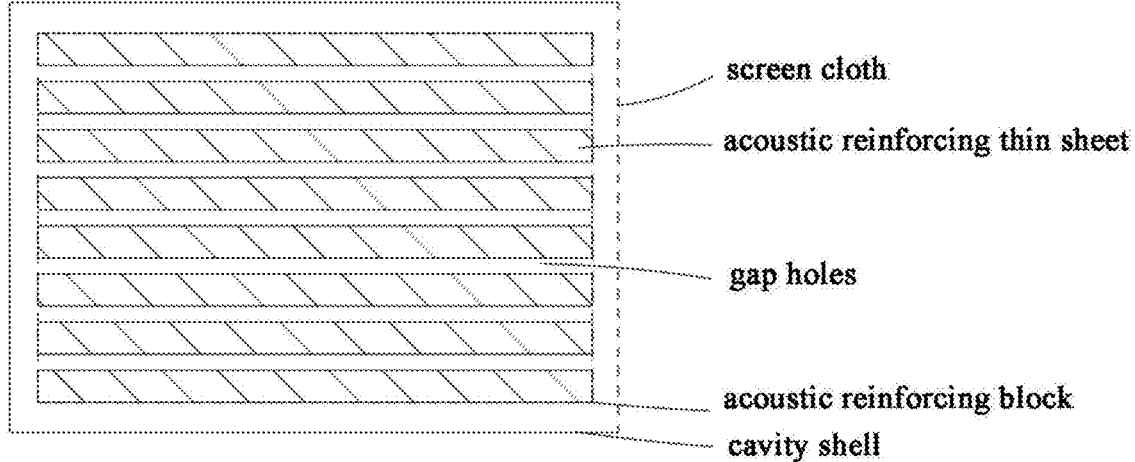
FIG. 2 is a schematic diagram of the structure of the acoustic reinforcing block of Example 1 when it is located within a front cavity resonator.

Further, an acoustic reinforcing block with interlayer gap holes is obtained by stacking the above thin block of monolayer acoustic reinforcing material. FIG. 2 is a schematic diagram of the structure of the acoustic reinforcing block of Example 1 when it is located within the front cavity resonator.

Example 2

Figure 3:
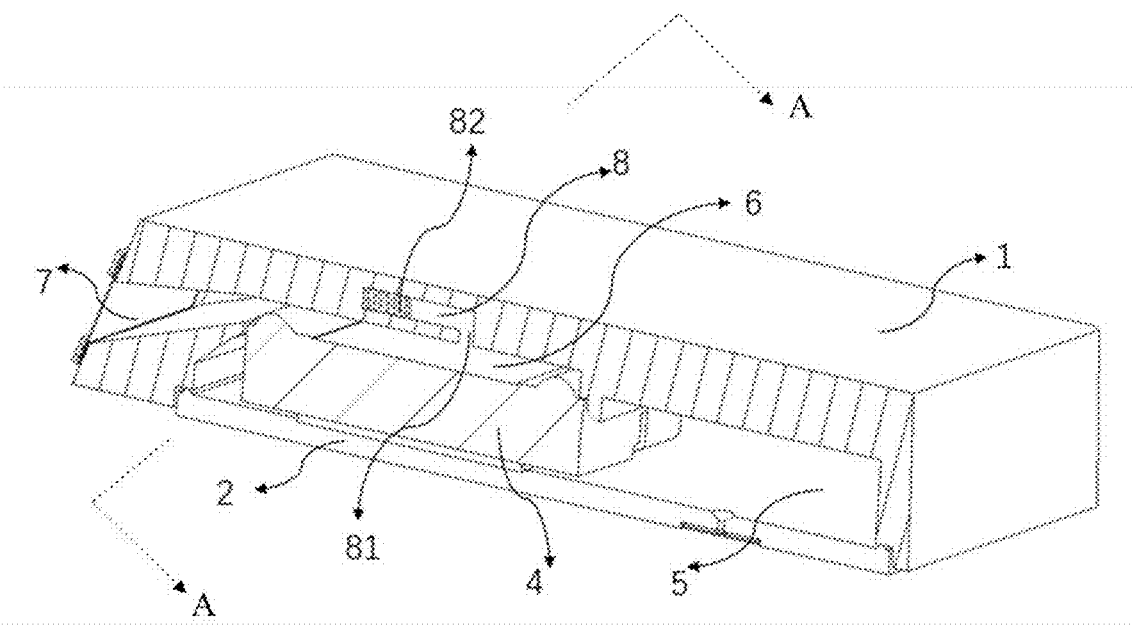
FIG. 3 is a schematic diagram of the structure of the micro speaker of Example 2.
Figure 4:
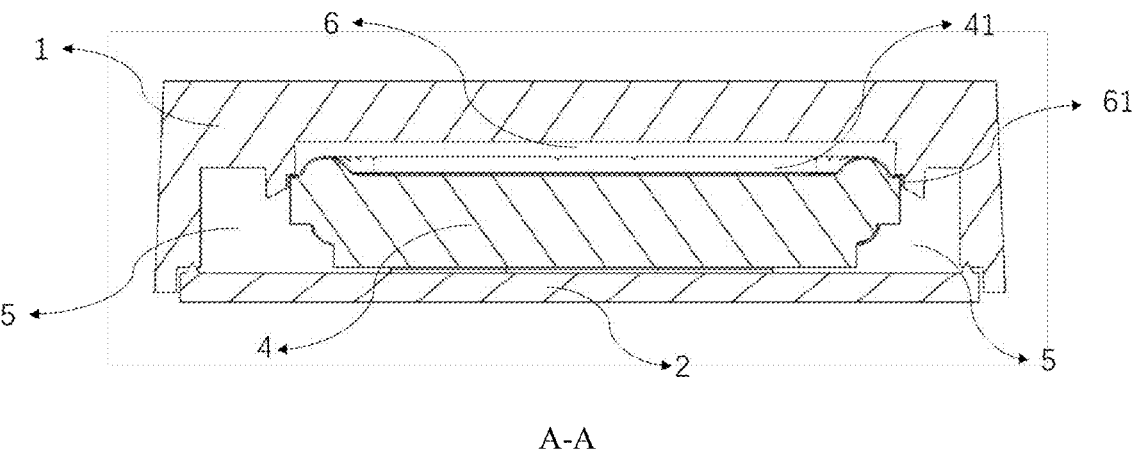
FIG. 4 is a cross-sectional view in the A-A direction of FIG. 3.
Figure 5:
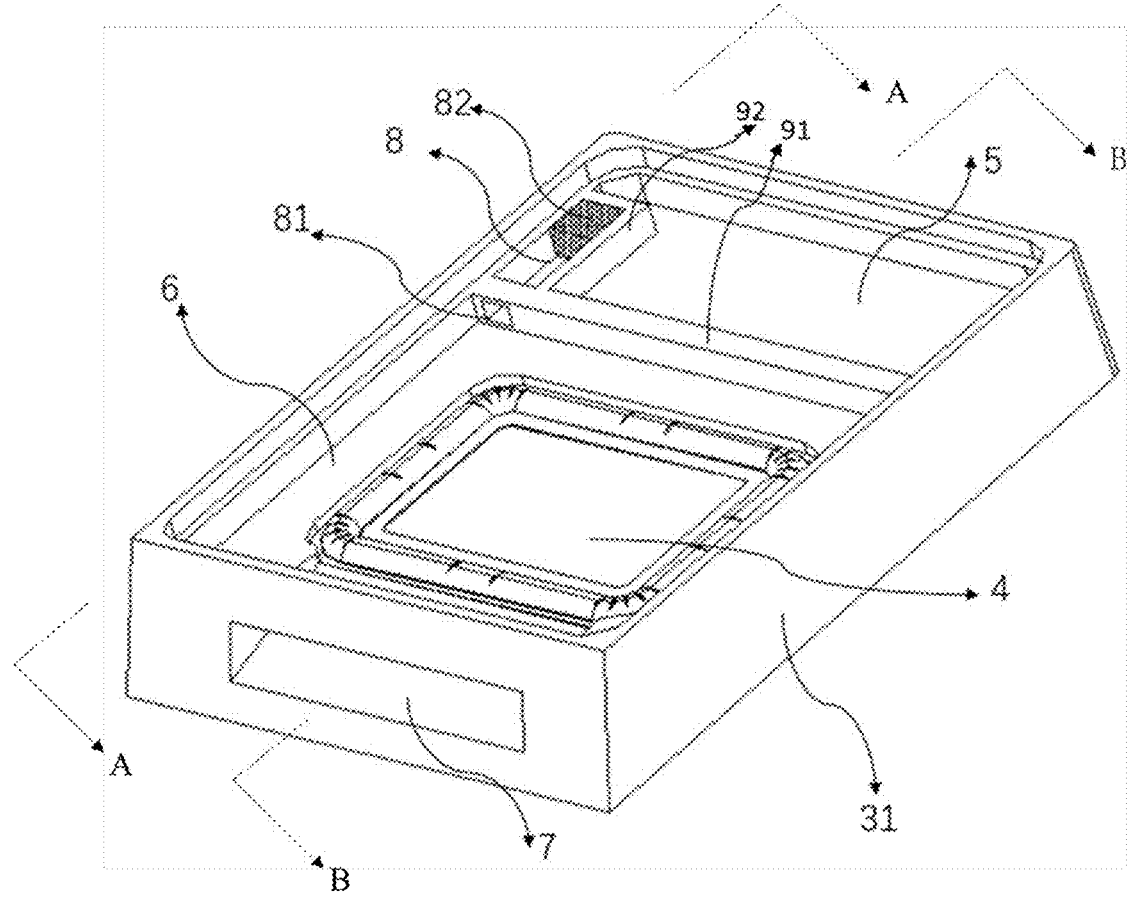
FIG. 5 is a schematic diagram of the structure of the micro speaker of Example 3.

This example provides a micro speaker. FIGS. 3 and 4 are schematic diagrams of the structure of the micro speaker. As shown in FIGS. 3 and 4, the micro speaker comprises an upper shell 1, a lower shell 2 and a speaker unit 4.

The upper shell 1 and the lower shell 2 are bonded by an adhesive to form a sealed inner cavity. Externally, the upper shell 1 and the lower shell 2 together form a rectangular shell of the micro speaker.

Here, the lower shell 2 is the bottom casing of the micro speaker.

The upper shell 1 is the top casing and side casing of the micro speaker, and the top and side of the upper shell 1 is an integrally molded structure. One side of the upper shell 1 is provided with a sound hole 7, and the inner top surface of the upper shell 1 is provided with three vertically downward spacing protrusions 61, which are located on the opposite and adjacent sides of the sound hole 7. The height of the spacing protrusions 61 is smaller than the height of the inner cavity, and the horizontal distance between the spacing protrusions 61 matches the radial dimension of the speaker unit 4.

The speaker unit 4 is located in the inner cavity and foam is filled between the bottom of the speaker unit and the lower shell 2. The speaker unit 4 is fixed at the top edges thereof between a plurality of spacing protrusions 61 by bonding with an adhesive. The speaker unit 4 includes a vibrating diaphragm 41, a voice coil assembly fixedly connected to the vibrating diaphragm 41 and a magnetic circuit system (not shown in the figures). The vibrating diaphragm 41 is located on the top of the speaker unit 4, and the edge of the vibrating diaphragm 41 is fixed to the magnetic circuit system. The edge of the vibrating diaphragm 41 is provided with an outwardly extending fixing member, which is fastened to the spacing protrusions 61. The space between the vibration diaphragm 41, the spacing protrusions 61, and the top casing of the upper shell 1 forms the front cavity 6, and the remaining space in the inner cavity is the rear cavity 5. Specifically, the rear cavity 5 includes the side of the speaker unit 4 distal to the sound hole 7, the spacing projection 61, the cavity between the upper shell 1 and the lower shell 2, and the cavity between the two sides of the speaker unit 4 and the side casing (the side adjacent to the sound hole).

The front cavity resonator 8 is located in the upper shell 1 above the center of the front cavity 6. A vent hole 81 is provided at a port on one side of the front cavity resonator 8, and the front cavity resonator 8 communicates with the front cavity 6 through the vent hole 81.

The side of the front cavity resonator 8 distal to the vent hole 81 is filled with the acoustic enhancement block 82 of Example 1, and the volume of the acoustic enhancement block 82 is 50% of the volume of the front cavity resonator 8. The acoustic enhancement block 82 used in this example has a shape that fits the cavity shell of the front cavity resonator 8, and may be filled in the front cavity resonator 8 in a state as shown in FIG. 2. A cushioning material that lines the inner wall of the cavity may also be provided inside the front cavity resonator 8.

In some other specific embodiments, the acoustic reinforcing block 82 may be replaced with another acoustic reinforcing material in the form of particles. In this case, the vent hole 81 of the front cavity resonator 8 may also be provided with a screen cloth for separating the acoustic reinforcing material particles from the front cavity 6, while avoiding the acoustic reinforcing material particles from falling off the front cavity resonator 8.

Example 3

This example provides a micro speaker. FIGS. 5 to 8 are schematic diagrams of the structure of the micro speaker. As shown in FIGS. 5 to 8, the micro speaker comprises an upper shell 1, a lower shell 2 and a speaker unit 4.

Figure 6:
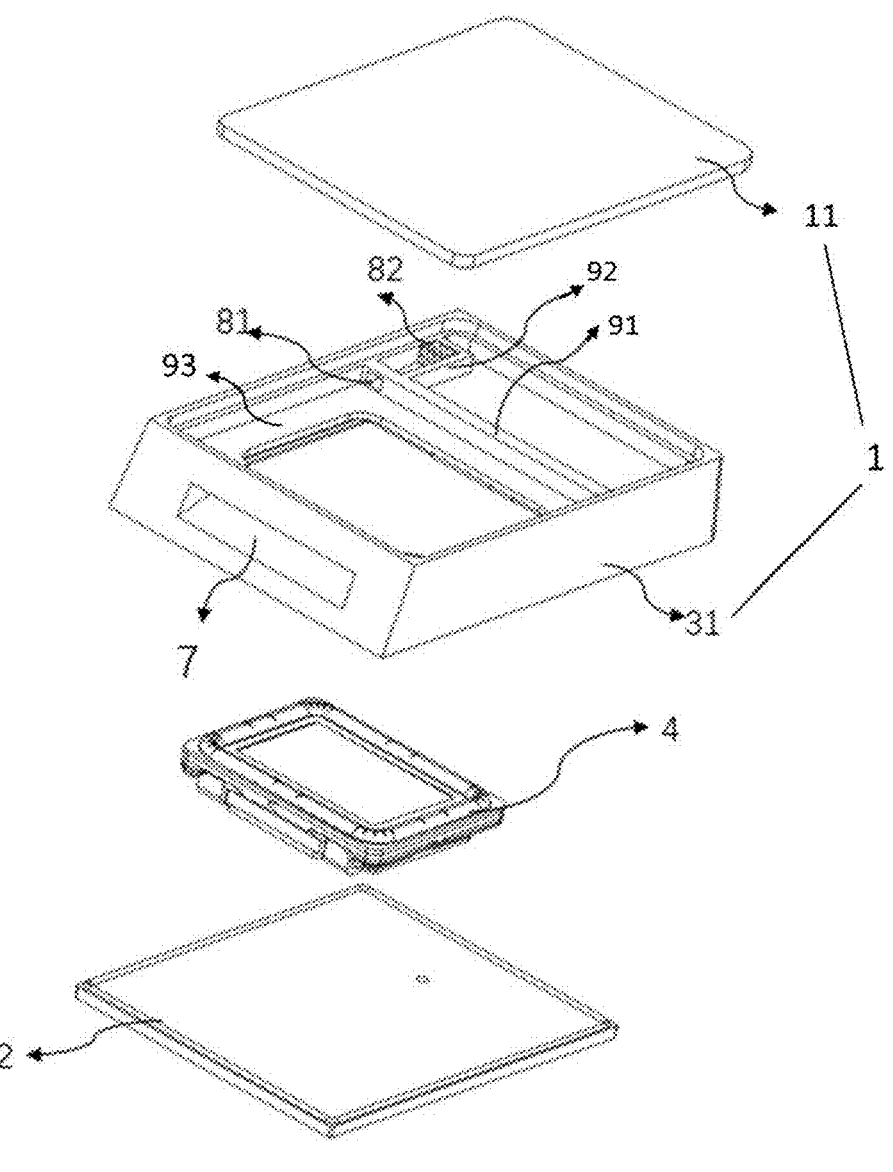
FIG. 6 is a schematic diagram of the structure of the micro speaker of Example 3.
Figure 7:
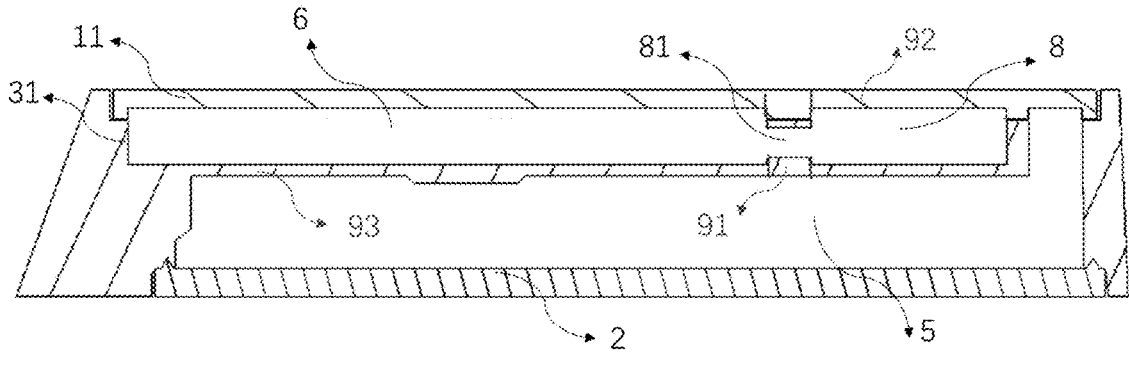
FIG. 7 is a cross-sectional view in the A-A direction of FIG. 5.
Figure 8:
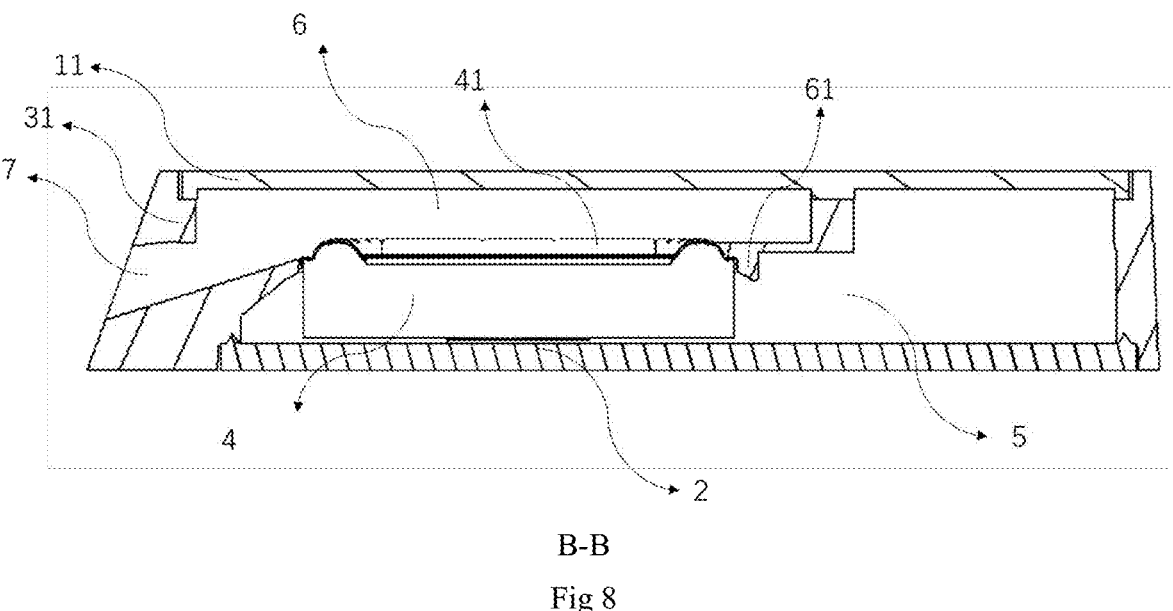
FIG. 8 is a cross-sectional view in the B-B direction of FIG. 5.

As shown in FIG. 6, the upper shell 1 and the lower shell 2 are bonded to form a sealed inner cavity. Externally, the upper shell 1 and the lower shell 2 together form a rectangular shell of the micro speaker. The upper shell 1 is the top casing, side casing and inner casing of the micro speaker, and the lower shell 2 is the bottom casing of the micro speaker.

On the basis of the upper shell 1 in Example 2, the upper shell 1 of this example is further provided with a first retaining wall 91, a second retaining wall 92, and an annular protruding platform 93. Specifically, the upper shell 1 of this example includes a first casing 11 and a second casing 31, wherein the first casing 11 is the top casing of the micro speaker, and the second casing (or referred as middle casing) 31 includes the side casing of the micro speaker (hereinafter referred to as "side casing"), the first retaining wall 91, the second retaining wall 92, and the annular protruding platform 93 fixed to the inner wall of the side casing. One side of the second shell 31 is provided with a sound hole 7.

The first retaining wall 91 and the second retaining wall 92 are provided in the direction extending from the upper shell 11 to the lower shell 2. The first retaining wall 91 is linear in shape.

The annular protruding platform 93 is provided between the side casing and the first retaining wall 91. The vertical distance between the annular protruding platform 93 and the first casing 11 substantially matches the vertical height of the first retaining wall 91.

The speaker unit 4 is fixed inside the micro speaker by embedding in the annular protruding platform 93. There is a space between the top surface of the speaker unit 4 and the first casing 11, and a foam is filled between the bottom surface of the speaker unit 4 and the lower shell 2.

The speaker unit 4 includes a vibrating diaphragm 41, a voice coil assembly fixedly connected to the vibrating diaphragm 41 and a magnetic circuit system (not shown in the figures). The vibrating diaphragm 41 is located on the top of the speaker unit 4, and the edge of the vibrating diaphragm 41 is fixed to the magnetic circuit system. The edge of the vibrating diaphragm 41 is provided with an outwardly extending fixing member, which is fastened to the first retaining wall 91.

The cavity between the side casing where the sound hole 7 is located, the first casing 11, the speaker unit 4, and the first retaining wall 91 is the front cavity 6, and the cavity in the inner cavity other than the front cavity 6 is the rear cavity 5. Specifically, the rear cavity 5 includes the cavity between the vertical surface where the first retaining wall 91 is located distal to the side of the sound hole 7, the first casing

11, the lower shell 2 and the side casing, and the cavity located on the vertical surface where the first retaining wall 91 is located distal to the side of the sound hole 7 and between the vibration diaphragm 41 and the lower shell 2.

The second retaining wall 92 which is bending in shape and located in the rear cavity 5, together with the side casing, the first retaining wall 91, and the first casing 11, surround and form the front cavity resonator 8. The front cavity resonator 8 is positioned close to the speaker unit 4 and located in the rear cavity 5 near the side of the front cavity. The front cavity resonator 8 is provided with a vent hole 81 at the first retaining wall 91, and the front cavity resonator 8 communicates with the front cavity 6 through the vent hole 81. The opening size of vent hole 81 is smaller than the height of the front cavity resonator. The acoustic enhancement block 82 of Example 1 is filled at one side of the front cavity resonator 8 distal to the vent hole 81, and the volume of the acoustic enhancement block 82 is 50% of the volume of the front cavity resonator 8. The acoustic enhancement block 82 used in this example has a shape that fits the cavity shell of the front cavity resonator 8, and may be filled in the front cavity resonator 8 in a state as shown in FIG. 2. A cushioning material that lines the inner wall of the cavity may also be provided inside the front cavity resonator 8.

In some other specific embodiments, the acoustic reinforcing block 82 may be replaced with another acoustic reinforcing material in the form of particles. In this case, the vent hole 81 of the front cavity resonator 8 may also be provided with a screen cloth for separating the acoustic reinforcing material particles from the front cavity 6, while avoiding the acoustic reinforcing material particles from falling off the front cavity resonator 8.

Comparative Example 1

This comparative example provides a micro speaker having a configuration that is substantially the same as that of the micro speaker of Example 2, except that the front cavity resonator 8 in the micro speaker of this comparative example is not filled with any materials (including not filled with the acoustic enhancement block of Example 1 or other acoustic enhancement materials).

Testing Example 1

Figure 9:
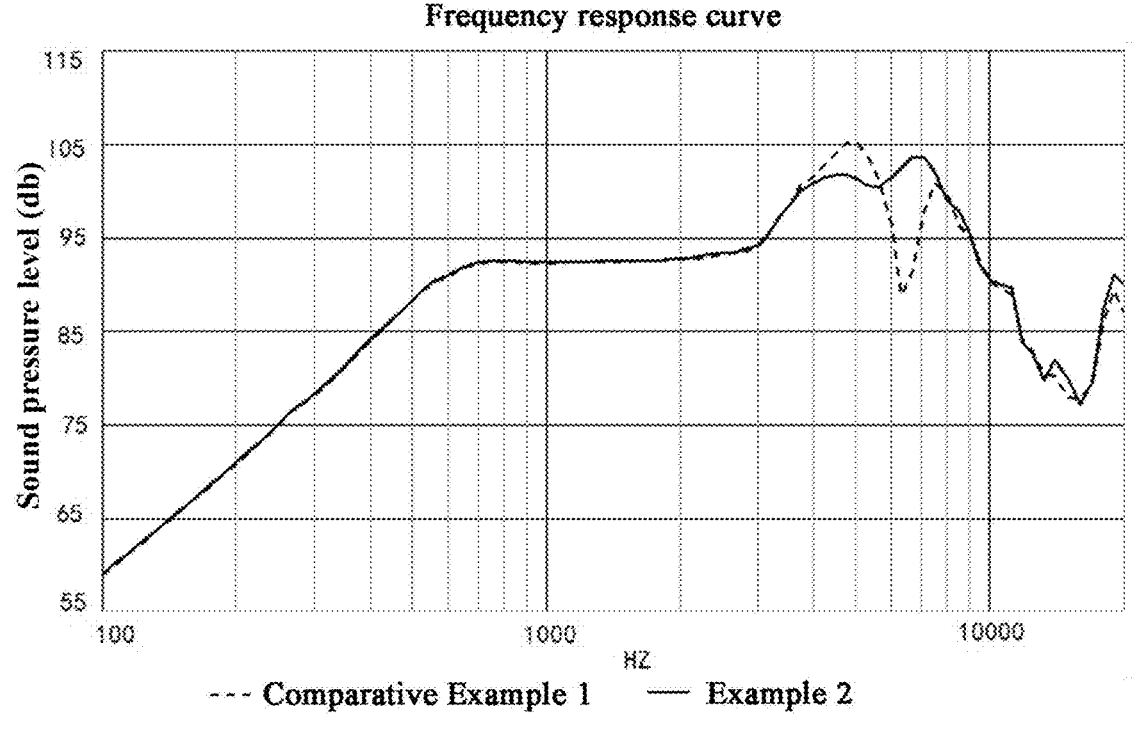
FIG. 9 is a performance test curve of the micro speakers of Example 2 and Comparative Example 1.

Performance tests was performed on the micro speaker of Example 2 and the micro speaker of Comparative Example 1, and the measured high-frequency frequency response curve is shown in FIG. 9. As can be seen from FIG. 9, compared with the micro speaker without an acoustic enhancement block (Comparative Example 1), the high frequency performance curve of the micro speaker filled with the acoustic enhancement block in the front cavity resonator (Example 2) is flatter, indicating that the acoustic enhancement block filled in the front cavity resonator provides a significant improvement to the sound quality of the micro speaker.

What is claimed is:

1. An acoustic reinforcing block, wherein raw materials for the acoustic reinforcing block comprise a porous material, a framework material, an adhesive, and an adjuvant, a structural framework of the acoustic reinforcing block is formed of a single layer of the framework material or formed by alternating lamination of two or more layers of the framework material, and the porous material, the adhesive and the adjuvant are supported on the structural framework;

wherein the framework material comprises one or a combination of two or more of fibrous paper, fibrous cloth and fibrous felt, the framework material is formed by alternating lamination of layered and/or corrugated fibrous paper, fibrous cloth or fibrous felt, pores exist among the framework materials laminated in the acoustic reinforcing block; and the acoustic reinforcing block is applied to speakers.

2. The acoustic reinforcing block according to claim 1, wherein the raw materials for the acoustic reinforcing block comprise 5-15% of the framework material, 2-10% of the adhesive, 0.05-2% of the adjuvant, and a balance of the porous material, based on 100% by mass of the acoustic reinforcing block, wherein the mass of the adhesive is measured as the solid mass of the adhesive.

3. The acoustic reinforcing block according to claim 1, wherein the acoustic reinforcing block is a single block and/or a block formed by lamination of two or more acoustic reinforcing blocks.

4. The acoustic reinforcing block according to claim 1, wherein the corrugated fibrous paper, fibrous cloth or fibrous felt has a corrugation height of 0.2 mm to 2 mm.

5. The acoustic reinforcing block according to claim 1, wherein the porous material comprises one or a combination of two or more of zeolite, activated carbon, and MOF materials;

the adhesive comprises an organic adhesive and/or an inorganic adhesive; the organic adhesive comprises one or a combination of two or more of a polyacrylate suspension, a polystyrene acetate suspension, a polyvinyl acetate suspension, a polyethylene vinyl acetate suspension, and a polybutadiene rubber suspension; and the inorganic adhesive comprises one or a combination of two or more of a silica sol, an alumina sol, and pseudo-boehmite;

the adjuvant comprises one or a combination of two or more of CMC, montmorillonite, kaolin, attapulgite and mica powder; and the framework material comprises chemical fibers; the framework material has a grammage per unit area of 10 $g/m^2$ to 100 $g/m^2$.

6. The acoustic reinforcing block according to claim 5, wherein the zeolite has a Si/M mass ratio of 200 or more, wherein the M is a trivalent metallic element.

7. The acoustic reinforcing block according to claim 6, wherein the M comprises one or a combination of two or more of iron, aluminum and titanium.

8. The acoustic reinforcing block according to claim 5, wherein the zeolite comprises one or a combination of two or more of MFI structured molecular sieves, FER structured molecular sieves, CHA structured molecular sieves, IHW structured molecular sieves, IWV structured molecular sieves, ITE structured molecular sieves, UTL structured molecular sieves, VET structured molecular sieves, MEL structured molecular sieves, and MTW structured molecular sieves.

9. The acoustic reinforcing block according to claim 5, wherein the framework material is prepared from chemical fibers by one of blended spinning, bonding, or wet forming;

individual fibers in the chemical fibers have a diameter of 2 μm to 40 μm.

10. The acoustic reinforcing block according to claim 9, wherein the chemical fibers comprise inorganic fibers and/or synthetic fibers;

the inorganic fibers comprise glass fibers and/or ceramic fibers, and the synthetic fibers comprise one or a combination of two or more of terylene, nylon, acrylic, polypropylene, vinylon, and chlorofibre.

11. A method of using the acoustic reinforcing block according to claim 1 in a micro speaker, wherein the method comprises filling the acoustic reinforcing block in the cavity of the micro speaker.

* * * * *